No. 708,830. Patented Sept. 9, 1902.
F. PULWITT.
ELEVATOR.
(Application filed Dec. 7, 1901.)
(No Model.) 2 Sheets—Sheet 2.
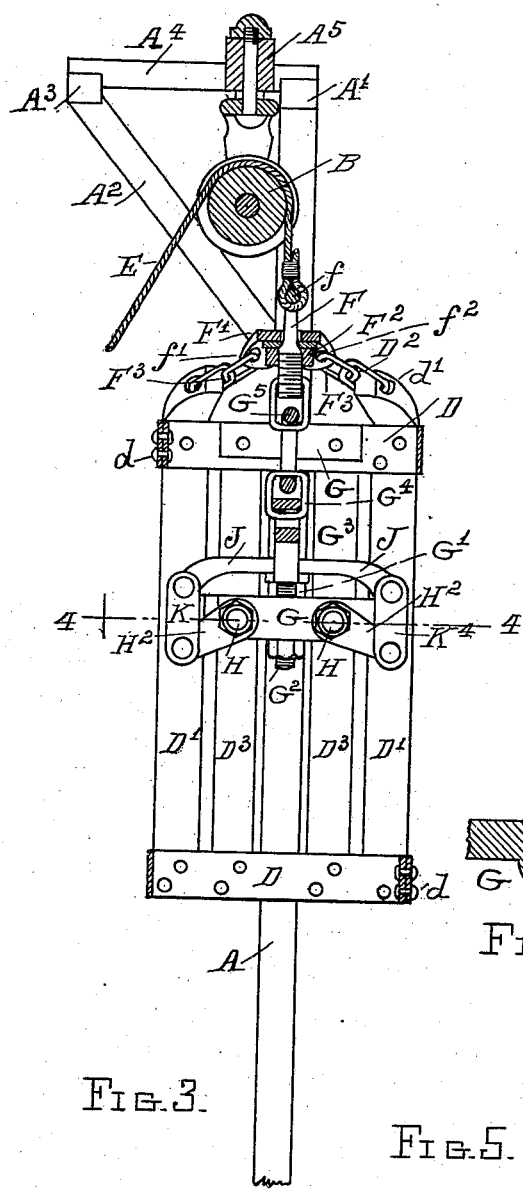
Fig. 3.
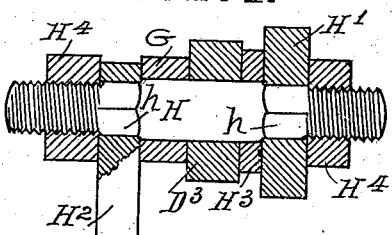
Fig. 4.
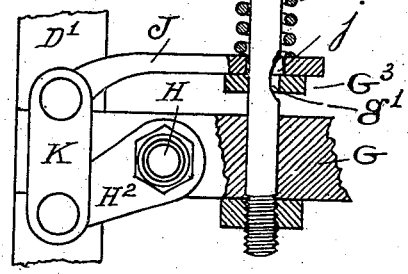
Fig. 6.
Fig. 5.
WITNESSES.
R. H. Dooling
Margaret McDonald
INVENTOR.
FREDRICK PULWITT.
By Atty N. DuBois.
THE NORRIS PETERS CO., PHOTO-LITHO., WASHINGTON, D. C.

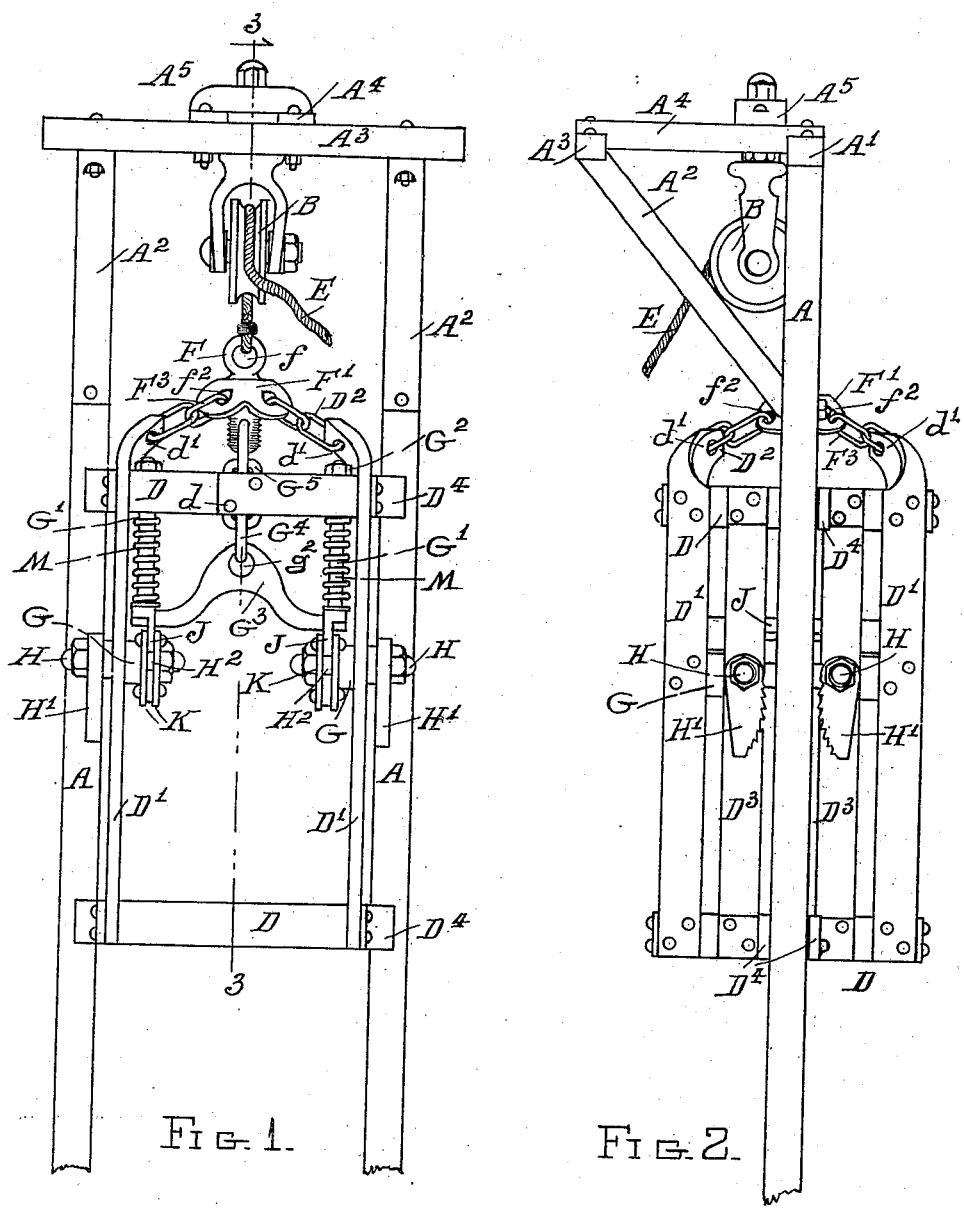

UNITED STATES PATENT OFFICE.

FREDRICK PULWITT, OF SPRINGFIELD, ILLINOIS.

ELEVATOR.

SPECIFICATION forming part of Letters Patent No. 708,830, dated September 9, 1902.

Application filed December 7, 1901. Serial No. 85,111. (No model.)

*To all whom it may concern:*

Be it known that I, FREDRICK PULWITT, a citizen of the United States, and a resident of the city of Springfield, county of Sangamon, and State of Illinois, have invented certain new and useful Improvements in Elevators, of which the following is such a full, clear, and exact description as will enable others skilled in the art to which it appertains to make and use my invention.

My invention relates particularly to elevators such as are used at mines for hoisting coal or the like; but my improvements may be employed in elevators of any other kind without departing from or sacrificing any of the advantages of my invention.

The purposes of my invention are to provide an elevator-cage of novel and improved construction, to provide in connection with said cage catches or dogs so constructed and arranged that immediately upon the parting of the rope or cable by means of which the cage is raised and lowered the dogs will engage with the guide-rails of the elevator to prevent the descent of the cage, to provide novel and improved connecting devices for connecting the dogs in operative position on the cage in such manner that the breaking or disabling of one of the dogs will not impair the effectiveness of the other dogs, and to provide a cage having external latches adapted to engage with the guide-rails of the elevator, also having within the cage latch-operating mechanism so constructed and arranged that the parts thereof are easily accessible for repair or replacement.

With these ends in view my invention consists of the novel features of construction and combinations of parts shown in the annexed drawings, to which reference is hereby made, and in which—

Figures 1 and 2 are respectively a front elevation and a side elevation of the complete apparatus. Fig. 3 is a vertical longitudinal section on the line 3 3 of Fig. 1. Fig. 4 is an enlarged transverse section on the line 4 4 of Fig. 3. Fig. 5 is an enlarged side elevation of the mechanism for operating one of the dogs, and Fig. 6 is a horizontal transverse section on the line 6 6 of Fig. 5.

Similar reference-letters designate like parts in the several views of the drawings.

Vertical posts A, preferably of wood, are suitably secured parallel to each other, and their upper ends are connected by a cross-piece A'. Braces $A^2$ project forwardly near the upper ends of the posts A, and the upper ends of the braces are connected by a cross-piece $A^3$. Parallel bars $A^4$ are secured on the cross-pieces A' and $A^3$. A block $A^5$ is supported and is longitudinally adjustable on the bars $A^4$. A sheave B depends from and is swiveled to turn under the block $A^5$.

The cage in its preferable form is a rectangular structure of bar-iron. The top and bottom frames D are formed from single bars of iron bent at right angles, and the ends of the bars are secured together by rivets $d$ or equivalent securing devices. The corner-pieces D' are riveted or otherwise secured to the frames D, and each of the corner-pieces has at its upper end an eye $d'$, adapted to receive a ring $D^2$. Intermediate vertical rails $D^3$ are secured to the frames D and in addition to strengthening the cage serve to support the dogs and connected parts, as hereinafter described. Box-shaped guides $D^4$ are secured to the frames D, travel on the posts A, and serve to prevent displacement of the cage. The cable E runs over the sheave B, and the lower end of the cable is connected with the winding-drum by means of which the elevator is operated. The upper end of the cable is secured in the eye $f$ of the bolt F. The bolt F passes through the plate F' and is secured in place by a nut $F^2$. The plate F' has wings $f'$, pierced by holes $f^2$. Links $F^3$ pass through the holes $f^2$ and the rings $D^2$ and connect the plate F' with the corner-posts D' in such manner that the weight of the cage and its load is borne equally by the four corner-posts of the cage, thus insuring free and uniform movement of the cage and avoiding undue strain on the cage. Two pairs of brackets G are secured in a horizontal position on the inside of the cage, the upper bracket of each pair being secured to the top frame D and the lower bracket of each pair being secured to the corner-pieces D'. The brackets G (see Fig. 5) are pierced by holes $g$, in which vertical rods G' fit loosely. The rods G' are screw-threaded at both ends and are provided with nuts $G^2$, which serve to keep the rods in place on the brackets. A yoke $G^3$ is pierced by holes $g'$, in which the rods G' fit loosely, so that the yoke will slide freely on the rods. At the center of the yoke is an eye $g^2$, in which a ring $G^4$ fits. A link $G^5$ connects the ring $G^4$ with the lower part of the eyebolt F. Bolts H, (see Fig. 4,) which pass through the rails $D^3$ and through the lower brackets G, have square parts $h$, on which the levers $H^2$ and the dogs H' fit. Washers $H^3$ separate the dogs H' from the rails $D^3$. Nuts $H^4$ fit on the bolts H and retain the levers and dogs in place on the bolts. By reason of the construction shown and described any one of the dogs or levers may be readily removed for repair or replacement without disturbing other parts of the mechanism. This feature is of great practical advantage, for the reason that repair or replacement of the parts mentioned may be made without interrupting the operation of the elevator. The arms J are pierced by holes $j$, in which the rods G' fit loosely. Links K connect the arms J with the levers $H^2$. Springs M surround the rods G' between the upper brackets G and the yoke $G^3$ and act against the arms J. The ends of the yoke $G^3$ underlie the arms J, and the rods G' pass through the yoke and the arms. The springs are compressed by upward movement of the yoke and react to force the yoke and the arms downward. When the yoke is raised, it raises the arms J, thereby causing the dogs H' to move away from the posts A.

The operation of the apparatus is as follows: When the cable E is wound around the drum, it pulls on the eyebolt F, lifting the bolt and causing the bolt to first lift the yoke, so as to disengage the dogs, and then by means of the plate F' and the links $F^3$ lift the entire cage. If then the cable be broken or released, the yoke will immediately gravitate to its first position, and the springs M will instantly react and cause the dogs to engage with the faces of the posts, so as to prevent the descent of the cage.

It will be seen that the operating parts of the mechanism except the dogs are all within the cage, where they are least subject to breakage; that they are all in the upper part of the cage, where they will not interfere with the convenient use of the elevator; that the operation of the safety-catch is quick and effective, and that the greater the weight of the cage and its load the more firmly the dogs will grip the posts.

Having fully described my invention, what I claim as new, and desire to secure by Letters Patent, is—

1. In an elevator, the combination of a cage, guides on said cage, posts on which said guides travel, brackets secured in said cage, rods detachably connected with said brackets, a yoke mounted to slide on said rods, arms mounted on said rods, springs inclosing said rods and acting against said arms, levers mounted on said cage, links connecting said levers with said arms and jaws operative by said levers and adapted to engage said posts, as set forth.

2. In an elevator, the combination of a cage having vertical rails, bolts having square parts and mounted to turn in holes in said rails, levers and dogs fitting on the square parts of said bolts, washers separating said dogs from said rails, nuts retaining said levers and dogs on said bolts, a yoke in operative connection with said levers, a cable connected with said yoke, guides on said cage, and posts on which said guides travel, and with which said dogs engage, substantially as set forth.

In witness whereof I have hereunto subscribed my name at Springfield, Illinois, this 15th day of October, 1901.

FREDRICK PULWITT.

Witnesses:
  R. H. DOOLING,
  FORDYCE W. BROWN.